United States Patent
Noda et al.

(10) Patent No.: US 8,464,042 B2
(45) Date of Patent: Jun. 11, 2013

(54) PERFORMANCE ADJUSTMENT APPARATUS AND METHOD OF INFORMATION PROCESSING APPARATUS

(75) Inventors: Hiroshi Noda, Kawasaki (JP); Toshio Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 12/969,869

(22) Filed: Dec. 16, 2010

(65) Prior Publication Data

US 2011/0087875 A1 Apr. 14, 2011

Related U.S. Application Data

(63) Continuation of application No. PCT/JP2008/001710, filed on Jun. 30, 2008.

(51) Int. Cl.
*G06F 9/00* (2006.01)

(52) U.S. Cl.
USPC ............................ 713/100; 713/500; 713/600

(58) Field of Classification Search
USPC .......................................... 713/100, 500, 600
See application file for complete search history.

(56) References Cited

U.S. PATENT DOCUMENTS

| | | | |
|---|---|---|---|
| 5,982,899 A * | 11/1999 | Probst | 713/1 |
| 6,721,892 B1 * | 4/2004 | Osborn et al. | 713/300 |
| 7,315,796 B2 * | 1/2008 | Flynn | 702/182 |
| 7,624,295 B2 * | 11/2009 | Taketoshi et al. | 713/500 |
| 7,716,501 B2 * | 5/2010 | Edwards et al. | 713/300 |
| 2003/0140264 A1 | 7/2003 | Kawano et al. | |
| 2004/0190558 A1 * | 9/2004 | Oliver | 370/503 |
| 2006/0053316 A1 * | 3/2006 | Yamazaki et al. | 713/300 |

FOREIGN PATENT DOCUMENTS

| | | |
|---|---|---|
| EP | 0 196 964 B1 | 2/1992 |
| JP | 61-246840 | 11/1986 |
| JP | 1-315828 | 12/1989 |
| JP | 2-153427 | 6/1990 |
| JP | 4-51325 | 2/1992 |
| JP | 2000-322331 | 11/2000 |
| JP | 2003-196083 | 7/2003 |
| JP | 2006-65430 | 3/2006 |

OTHER PUBLICATIONS

Japanese Office Action issued Oct. 23, 2012 in corresponding Japanese Patent Application No. 2010-518824.

* cited by examiner

*Primary Examiner* — Kim Huynh
*Assistant Examiner* — Zahid Choudhury
(74) *Attorney, Agent, or Firm* — Staas & Halsey LLP

(57) ABSTRACT

A performance adjustment apparatus connected to an information processing apparatus includes a performance adjustment unit that controls operation processing performance of an operation processing apparatus of the information processing apparatus based on a specified performance adjustment value, a performance type list information management unit that manages performance type list information comprising a plurality of pairs of a performance type and a performance adjustment value, a performance type specification unit that specifies a performance type in the performance type list information managed by the performance type list information management unit and changes the performance type, a performance adjustment value setting unit that obtains a performance adjustment value corresponding to the performance type specified by the performance type specification unit from the performance type list information management unit, and sets the obtained performance adjustment value in the performance adjustment unit.

10 Claims, 19 Drawing Sheets

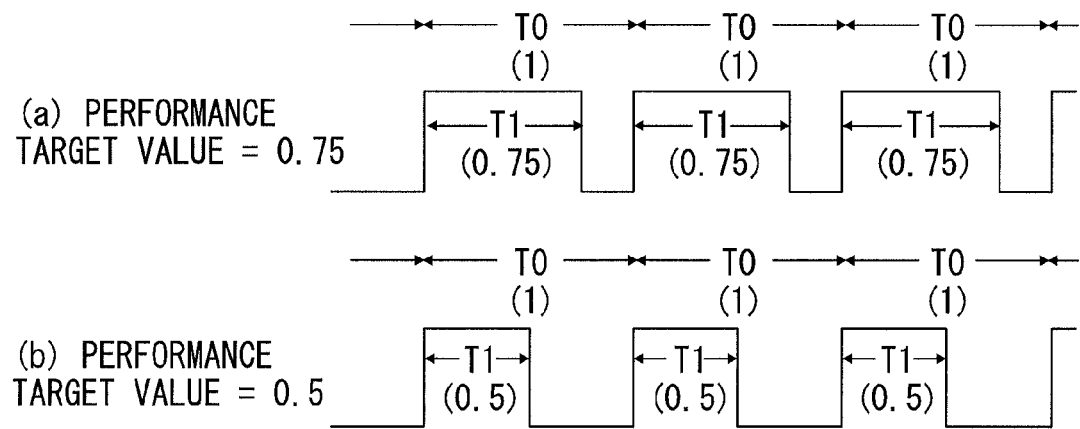
F I G. 2

| MODEL TYPE NAME | PERFORMANCE VALUE (PERFORMANCE RATIO) | DEGRADE COUNTER VALUE |
|---|---|---|
| TYPE E | 0.85 | 0000 0011 |

FIG. 4

| ENTRY NUMBER | MODEL TYPE NAME | PERFORMANCE VALUE (PERFORMANCE RATIO) | DEGRADE COUNTER VALUE |
|---|---|---|---|
| 1 | TYPE E | 0.85 | 0000 0011 |
| 2 | TYPE F | 0.80 | 0000 0100 |
| 3 | TYPE G | 0.75 | 0000 0101 |
| 4 | TYPE H | 0.70 | 0000 0110 |
| 5 | TYPE I | 0.65 | 0000 0111 |

F I G. 5

| MODEL TYPE CHANGE DATE AND TIME | MODEL TYPE NAME BEFORE CHANGE | MODEL TYPE NAME AFTER CHANGE |
|---|---|---|

FIG. 6

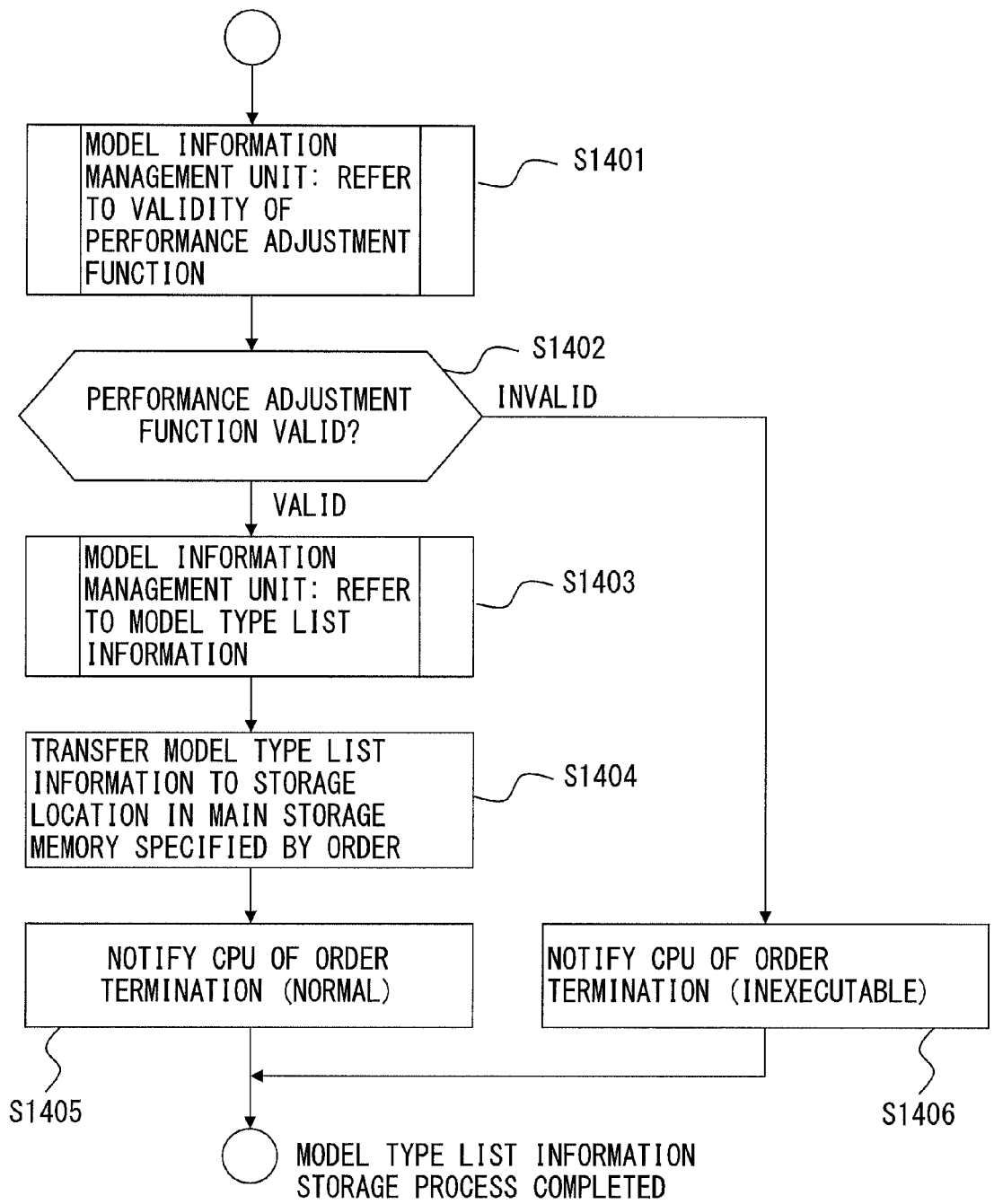
F I G. 1 4

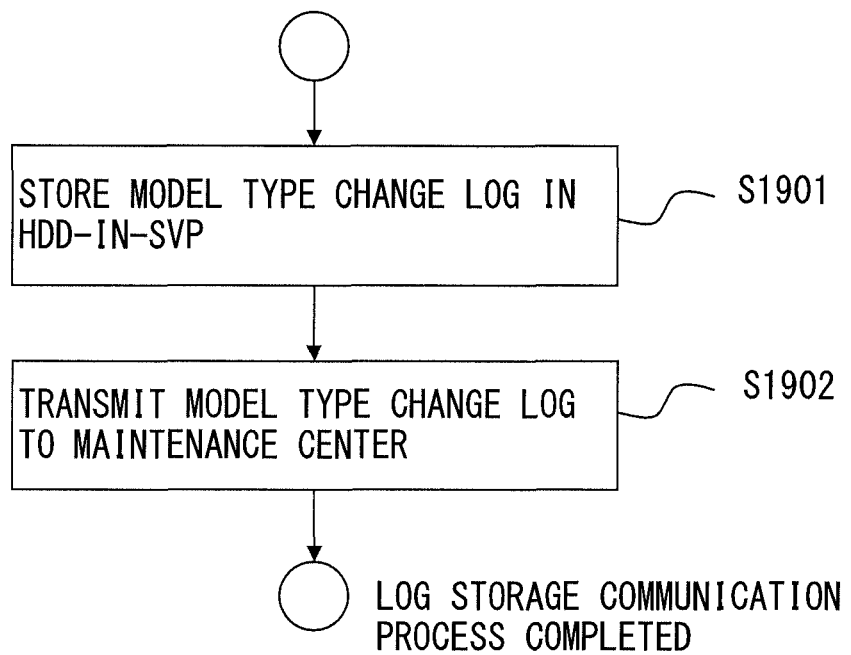
F I G. 1 9

PERFORMANCE ADJUSTMENT APPARATUS AND METHOD OF INFORMATION PROCESSING APPARATUS

CROSS REFERENCE TO RELATED APPLICATION

This application is a continuation of PCT application PCT/JP2008/001710, filed on Jun. 30, 2008, the entire contents of which are incorporated herein by reference.

FIELD

Embodiments disclosed herein relate to a performance adjustment apparatus and method of information processing apparatus.

BACKGROUND

Conventionally, the performance of a CPU (central processing unit) in an information processing apparatus such as a main frame is fixed for each product model and corresponds to the price. For this reason, with initial adoption of a main frame, the user needs to adopt a product model that corresponds to the CPU performance required for the peak of the processing amount.

However, periods in which the processing amount increases and decreases can be planned by the user, and there is a need for reducing cost by degrading the CPU performance in a period with a low utilization rate. On the other hand, there is also a need for enhancing the processing capacity by raising the CPU performance while utilizing the current machine model as much as possible when the processing amount increases.

Meanwhile, for a manufacturer offering main frames such as the applicant, there is a need to keep manufacturing cost low by manufacturing a large volume of a little variety of products, rather than manufacturing a small volume of a large variety of main frame products.

Therefore, if the CPU performance can be made variable in one unit of a main frame product, it becomes possible for the manufacturer side to offer product efficiently, by determining the CPU performance upon shipment from the factory.

For such reasons, the applicant disclosed a technique, in an information processing apparatus, comprising means to specify a performance target value, means to generate a performance control pulse according to and corresponding to the specified performance target value and order execution means to set an order execution period and an order execution suppression period alternately according to the generated performance control pulse, with which the performance of an information processing apparatus can be adjusted with a high accuracy, by matching the ratio of the pulse period to the pulse width of the performance control pulse with the performance target value by the means to generated a performance control pulse, in Japanese Laid-open Patent Publication No. 61-246840 (hereinafter, Patent Document 1).

Furthermore, in Japanese Laid-open Patent Publication No. 01-315828 (hereinafter, Patent Document 2), a technique with which conflict and the like with the operation timing of another information apparatus can be avoided by making the period of the performance control pulse adjustable was disclosed.

As another conventional art, Japanese Laid-open Patent Publication No. 2003-196083 (hereinafter, Patent Document 3) discloses a technique to suppress the power consumption and heat generation for the system as a whole in a case in which the CPU requires a wait time in relation with a device or in processing a program, by degrading the operation performance of the CPU and suppressing the power consumption.

Meanwhile, Japanese Laid-open Patent Publication No. 04-051325 (hereinafter, Patent Document 4) discloses a technique related to a method of adjusting the CPU usage time for each program.

In addition, Japanese Laid-open Patent Publication No. 2006-65430 (hereinafter, Patent Document 5) discloses a technique that makes it possible to change the CPU performance of a virtual machine and to use the virtual machine with the performance according to the user's need by changing a dummy cycle added to the order execution process according to the user's usage status of the virtual machine and the user's usage conditions of the machine.

However, with the technique disclosed in Patent Document 1, the CPU performance of the main frame is fixed upon shipment from the factory and cannot be changed afterward.

In addition, with each technique disclosed in Patent Documents 2-5, while each of them offers a technique with which the CPU performance can be adjusted, the CPU performance cannot be set easily and securely according to changes in the operation contract.

Thus, conventionally, the need of main frame users could not be satisfied sufficiently for operation change such as to reduce cost by entering a usage contract with a degraded CPU performance corresponding to a low processing amount upon adopting, and to raise the CPU performance gradually by upgrading the usage contract according to increases in the processing amount afterward.

SUMMARY

According to an aspect of the invention, a performance adjustment apparatus having performance adjustment unit to control operation processing performance of an operation processing apparatus of an information processing apparatus based on a specified performance adjustment value, includes: performance type list information management unit to manage performance type list information comprising a plurality of pairs of a performance type and a performance adjustment value; performance type specification unit to specify a performance type in performance type list information managed by the performance type list information management unit and to perform change of the performance type; performance adjustment value setting unit to obtain a performance adjustment value corresponding to the performance type specified by the performance type specification unit from the performance type list information management unit, and to set the obtained performance adjustment value in the performance adjustment unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a performance control pulse;

FIG. 4 is a diagram illustrating an example of a basic model type information;

FIG. 5 is a diagram illustrating an example of a model type list information;

FIG. 6 is a diagram illustrating an example of a model type change log;

FIG. 14 is an operation flowchart illustrating the operation of a model type list information storage process executed by a performance adjustment processing unit;

FIG. 19 is an operation flowchart illustrating the operation of a log storage communication process executed by a log notification processing unit.

DESCRIPTION OF EMBODIMENTS

Hereinafter, embodiments according to the present invention are described with reference to drawings.

Figure 1:
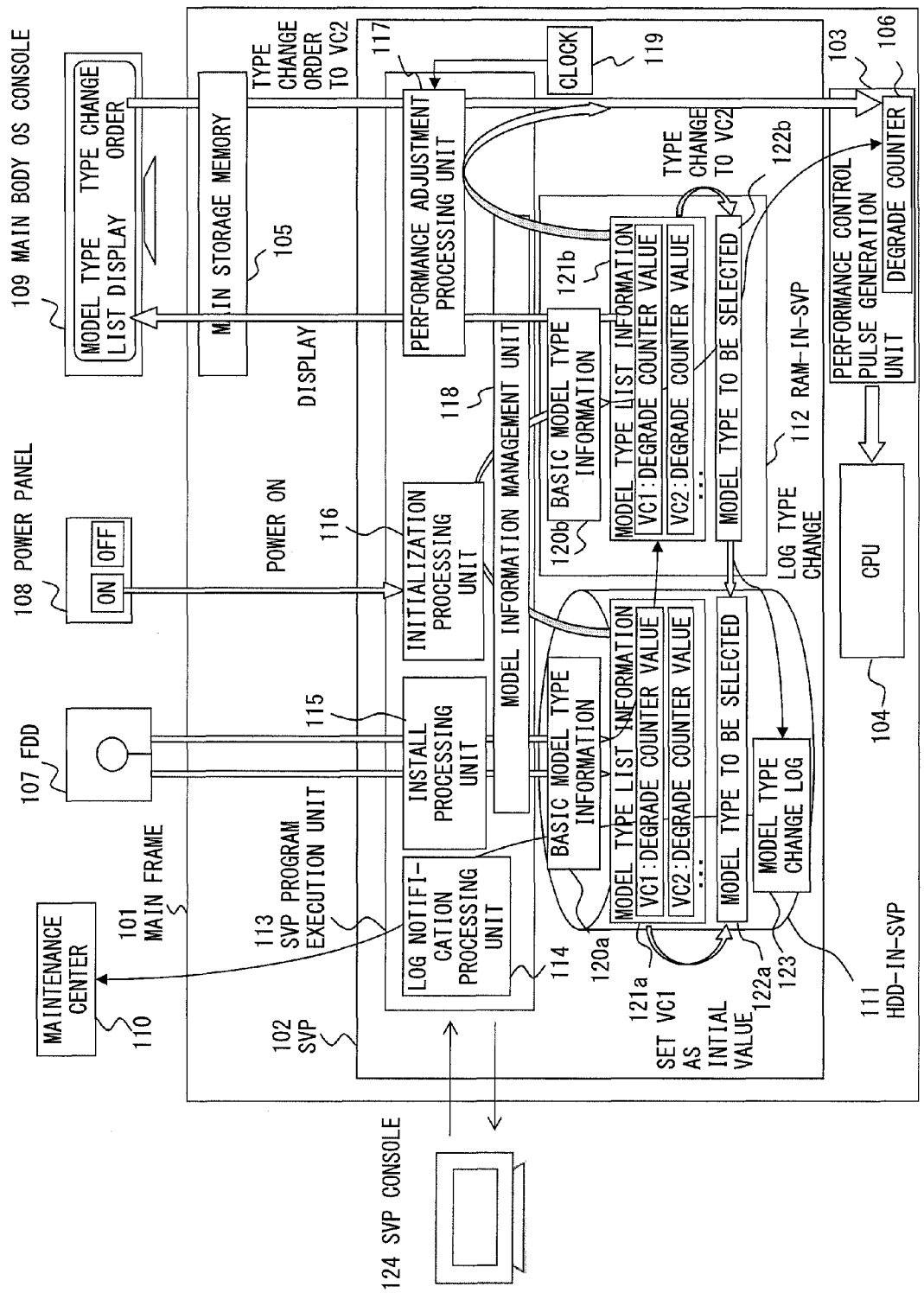
FIG. 1 is a system configuration diagram according to an embodiment.

FIG. 1 is a system configuration diagram according to an embodiment.

In the configuration in FIG. 1, a performance control pulse generation unit 103 generates, according to a performance target value set in a degrade counter 106, a performance control pulse corresponding to the performance target value, and a CPU 104 executes a program order while setting an order execution period and an order execution suppression period alternately according to the generated performance control pulse. In this case, the performance of the CPU 104 of a main frame 101 can be adjusted with a high accuracy by controlling the ratio of the pulse period and the pulse width of the performance control pulse as illustrated in FIG. 2 (*a*) or FIG. 2 (*b*) according to the performance target value by the performance control pulse generation unit 103.

Figure 3:
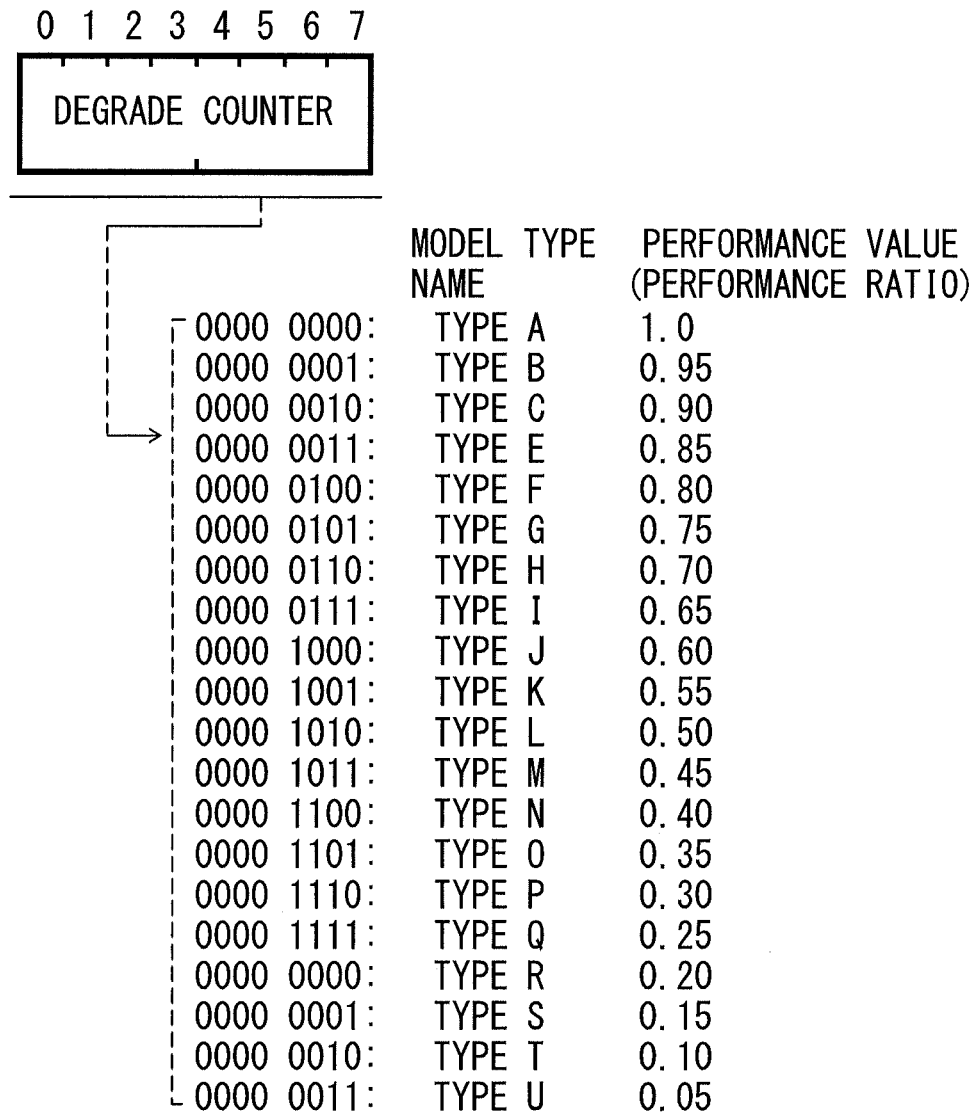
FIG. 3 is a diagram illustrating an example of values set in a degrade counter according to respective model types and respective performance values of a product.

FIG. 3 is a diagram illustrating an example of values set in the degrade counter 106 according to respective model types and the respective performance values of a product. In the degrade counter 106, each degrade counter value expressed in eight bits for each model type is set.

In FIG. 1, the main frame 101 is a general-purpose computer system, having the CPU (central processing unit) 104, a main storage memory 105, as well as the performance control pulse generation unit 103 described above and a service processor (SVP) 102.

The SVP 102 is a dedicated processor that monitors setting information and initial diagnosis as well as the operation status from power on to power off of the main frame 101, and has an SVP program execution unit 113, an HDD-in-SVP 111 being a dedicated hard-disk drive, and a RAM-in-SVP 112 being a dedicated memory device, and so on inside.

The SVP program execution unit 113 is a part constituted by hardware and software for realizing respective processing functions of an install processing unit 115, a initialization processing unit 116, a performance adjustment processing unit 117, a model information management unit 118, and a log notification processing unit 114.

To the exterior of the main frame 101, a floppy disk drive (FDD) 107 to which a floppy disk for performance adjustment can be inserted, a power panel 108 ordering power on and power off of the main frame 101, an SVP console 124 for performing maintenance works such as stop-install and active-install and the like of the performance adjustment function of the apparatus and a main body OS console 109 for displaying different model types with difference performances and ordering change are connected, as well as a maintenance center 110 being remotely connected via the Internet and the like.

The outline procedures of the performance adjustment using a performance control pulse (degrade counter) in this embodiment are as follows.

A model type change command is executed from the main body OS console 109.

The CPI 104 issues a model type change request to the SVP 102.

The SVP 102 refers to model type list information 121*b* in the RAM-in-SVP 112, and checks whether change to the model type after change is allowed.

The SVP 102 sets, when the model type after change is allowed, a corresponding degrade counter value in the degrade counter 106 in the performance control pulse generation unit 103.

The performance control pulse generation unit 103 generates a performance control pulse (see FIG. 2) of a width indicating an order execution period and an order inexecutable period, according to the value of the degrade counter set in the degrade counter 106.

The CPU 104 realizes the operation with the set target performance by sequentially executing orders during the order execution period and suppressing the execution of orders during the order inexecutable period based on the performance control pulse.

In this embodiment, with the performance adjustment function, the performance adjustment mechanism can be validated only by inserting a floppy disk for performance adjustment into the FDD 107 connected to the main frame 101 according to the operation contract and executing an install process from the SVP console 124. It is characterized in that performance adjustment of the main frame 101 can be performed easily and securely only be issuing a command required for change of the model type by the user after that from the main body OS console 109.

In addition, this embodiment is also characterized in that and a charging process of the usage fee corresponding to change of the model type can be performed easily by taking a log of change of the model type (model type change log) 123 and transmitting it from the main frame 101 to the remote maintenance center 110 to perform centralized management.

To realize the characteristic functions described above, the SVP 102 of the main frame 101 manages basic model type information 120 (a, b), model type list information 121 (a, b), model type to be selected 122 (a, b) and the model type change log 123, and is packaged with the SVP program execution unit 113 for managing them.

The basic model type information 120 is data that must be installed upon initial adoption of the main frame 101 regardless of adoption of the performance adjustment function, and is stored as the basic type information 120a and the basic type information 120b in the HDD-in-SVP 111 and the RAM-in-SVP 112, respectively.

FIG. 4 is a diagram illustrating an example of a basic model type information 120. For convenience of display for the user, the model type name and the performance value (performance ratio) are stored, as well as the degrade counter value to be set in the degrade counter 106.

The basic model type information 120a stored in the HDD-in-SVP 111 is copied from the basic model type information 120 in a floppy disk set in the FDD 107 by the install processing unit 115 and the mode information management unit 118 in the SVP program execution unit 113 at the time of stop-install in the main frame 101 (at the time of initial adoption or stop-upgrade of the product model).

The basic model type information 120b stored in the RAM-in-SVP 112 is decoded from the basic model type information 120a in the HDD-in-SVP 111 and loaded by the initialization processing unit 116 and a model information management unit 118 in the SVP program execution unit 113 at the time of the initialization process (at the time of booting) of the main frame 101.

The model type list information 121 is data that becomes an option installed in the case of adopting the performance adjustment function in the main frame 101.

The model type list information 121 is stored in the HDD-in-SVP 111 and the RAM-in-SVP 112 as a table defining degrade counter values for setting up the stand-alone performance of the CPU for each model type corresponding to the performance levels of the main frame 101.

FIG. 5 is a diagram illustrating an example of the model type list information 121. For each model type corresponding to a plurality of performance levels, the entry number, the model type name and the performance value (performance ratio) for convenience of display for the user are stored, as well as the degrade counter value to be set in the degrade counter 106.

The model type list information 121a stored in the HDD-in-SVP 111 is copied from the model type list information 121 in a floppy disk set in the FDD 107 by the install processing unit 115 and the model information management unit 118 in the SVP program execution unit 113 at the time of stop-install in the main frame 101 (at the time of initial adoption or stop-upgrade of the product model) or at the time of active-install in the main frame 101 (at the time of active-upgrade of the product model). If only the basic model type information 120 is stored in the floppy disk and the model type list information 121 is not stored, the model type list information 121 is not copied to the HDD-in-SVP 111.

The model type list information 121b stored in the RAM-in-SVP 112 is decoded from the model type list information 121a in the HDD-in-SVP 111 and loaded by the initialization processing unit 116 and a model information management unit 118 in the SVP program execution unit 113 at the time of the initialization process (at the time of booting) of the main frame 101. If there is no model type list information 121a in the HDD-in-SVP 111, the model type list information 121b having only an entry related to the performance of the model type (basic model type) indicated by the basic model type information 120a in the HDD-in-SVP 111 is generated and stored in the RAM-in-SVP 112.

In addition, the model type list information 121b stored in the RAM-in-SVP 112 is decoded and loaded from the model type list information 121a that is copied as the model type list information 121a from the model type list information 121 in the floppy disk set in the FDD 107 to the HDD-in-SVP 111 by the install processing unit 115 and the model information management unit 118 in the SVP program execution unit 113 at the time of active-install in the main frame 101 (at the time of active-upgrade of the product model).

In addition to the basic model type information 120a, 120b and the model type list information 121a, 121b described above, regarding the model type to be selected 122, entry numbers (see FIG. 5) in the model type list information 121 for the model type to be allowed for the user are stored in the HDD-in-SVP 111 and the RAM-in-SVP 112.

In the model type to be selected 122 stored in the HDD-in-SVP 111, the entry number corresponding to the performance value of the basic model type information 120a among the entry numbers (see FIG. 5) in the model type list information 121a is stored by the install processing unit 115 and the model information management unit 118 in the SVP program execution unit 113 at the time of stop-install in the main frame 101 (at the time of initial adoption or at the time of stop-upgrade of the product model). If the model type list information 121a is not installed, the model type to be selected 122 is not generated.

In the model type to be selected 122b stored in the RAM-in-SVP 112, the model type to be selected 122a in the HDD-in-SVP 111 is copied and loaded by the initialization processing unit 116 and the model information management unit 118 in the SVP program execution 113 at the time of the initialization process (at the time of booting) of the main frame 101. In addition, if a change order for the model type is generated from the user during operation, the entry number corresponding to the model type after change among the entry numbers in the model type list information 121b stored in the RAM-in-SVP 112 is stored.

In the model type change log 123, the date and time of change, as well as the model type name before change and the model type name after change are stored as illustrated in FIG. 6 when a change order for the model type is generated from the user during operation, and thereby change history information is accumulated as needed.

The operations in this embodiment using each information described above are explained in detail below. The respective parts represented as 101-123 are those illustrated in FIG. 1.

First, a stop-install process is explained. This process is executed by the install processing unit 115 in the SVP program execution unit 113 at the time of initial adoption or at the time of stop-upgrade of the product model.

In this stop-install process, the basic model type information 120 and the model type list information 121 (in the case in which it is stored) in the floppy disk set in the FDD 107 are installed in the HDD-in-SVP 111 as the basic model type information 120a and the model type list information 121a, respectively, at the time of stop-install in the main frame 101 (at the time of initial adoption of at the time of stop-upgrade of the product model).

Figure 7:
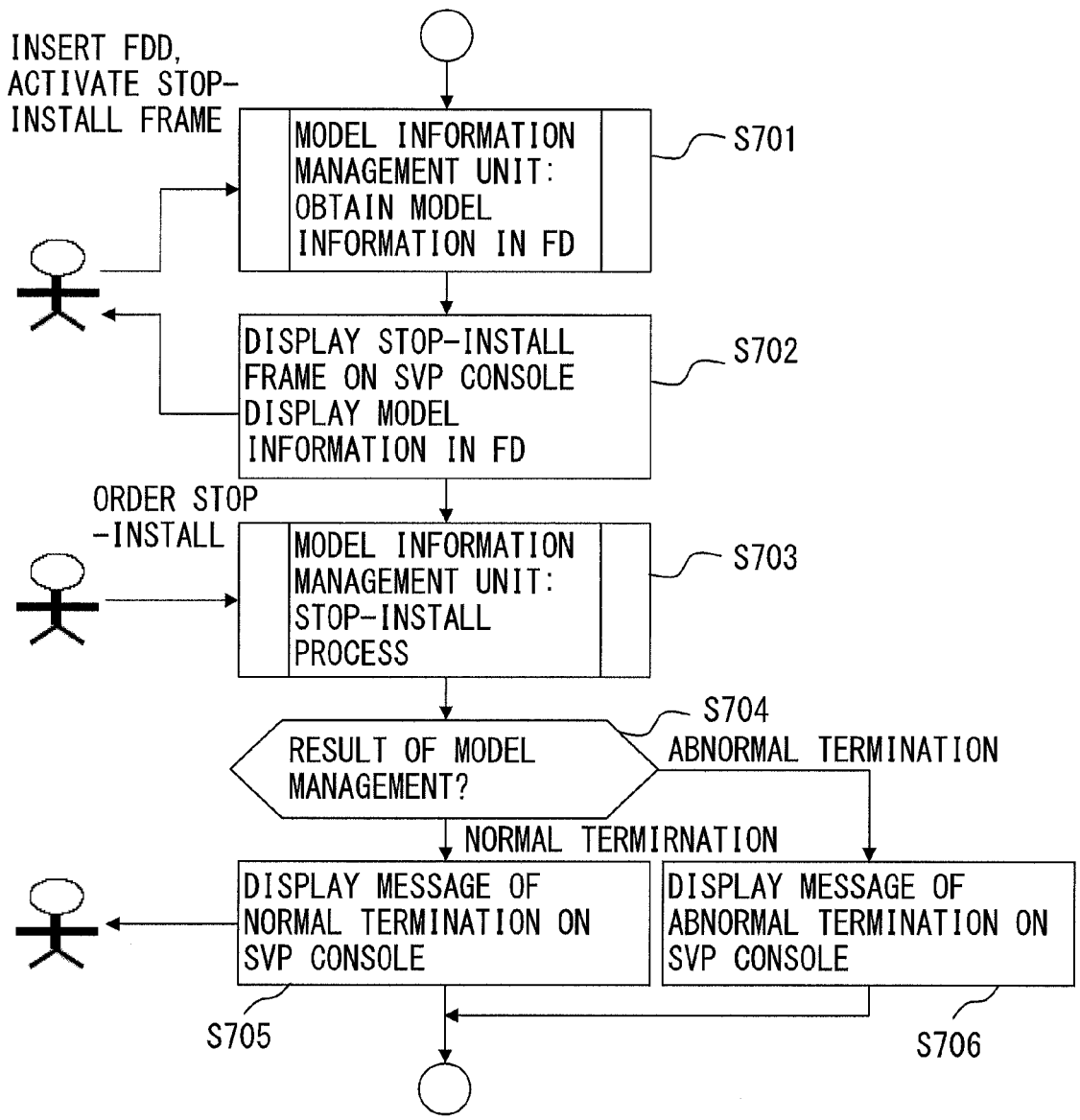
FIG. 7 is an operation flowchart illustrating the operation of a stop-install frame executed by an install processing unit.

FIG. 7 is an operation flowchart illustrating the operation of a stop-install frame executed by the install processing unit 115. This process is realized by an operation processor provided in the SVP program execution unit 113 and program software executed by it.

First, an operation maintenance person (such as a system engineer of the manufacturer offering the main frame 101) inserts a floppy disk (FD) for performance adjustment in the FDD 107 and orders activation of the stop-install frame from the SVP console 124, the install processing unit 115 orders the model information management unit 118 to obtain model information in the FD. As a result, the model information management unit 118 obtains, from the basic model type information 120 (see FIG. 4) and the model type list information 121 (see FIG. 5), their model type name and performance value (performance ratio), and notifies the install processing unit 115 of them (step S701 in FIG. 7).

As a result, the install processing unit 115 displays the stop-install frame on the SVP console 124, and also displays, for each of the basic model type information 120 and the model type list information 121, their respective model type name and performance value (performance ratio) on the SVP console 124 (step S702 in FIG. 7).

The operation maintenance person orders stop-install from the SVP console 124, after checking the display contents. As a result, the install processing unit 115 orders the model information management unit 118 to activate the stop-install process (step S703 in FIG. 7).

Figure 8:
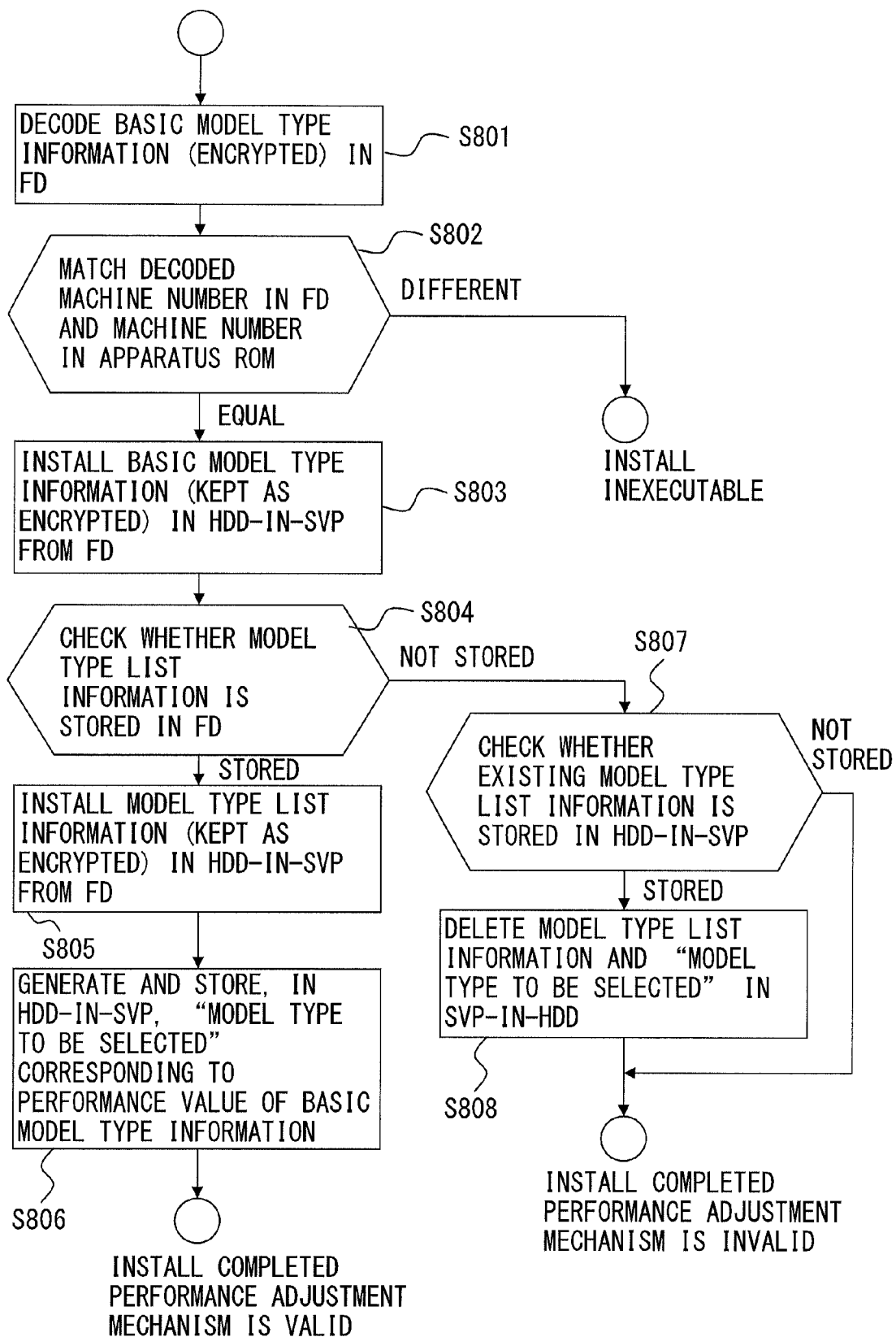
FIG. 8 is an operation flowchart illustrating the operation of a stop-install process executed by a model information management unit.

FIG. 8 is an operation flowchart illustrating the operation of the stop-install process executed by the model information management unit 118.

The model information management unit 118 decodes encrypted basic model type information 120 stored in the FD (step S801 in FIG. 8).

Next, the model information management unit 118 checks whether or not the machine number decoded from the FD matches with the machine number stored in an apparatus ROM at the main frame 101 side that is not particularly illustrated in the drawing (step S802 in FIG. 8).

If the two machine numbers do not match with each other, the model information management unit 118 performs abnormal termination of the process as install cannot be executed. In this case, upon the abnormal termination of the process in step S703 in FIG. 7, the install processing unit 115 displays a message of abnormal termination on the SVP console 124, and terminates the stop-install frame (step S703->S704->S706 in FIG. 703).

If the two machine numbers match each other in step S802 in FIG. 8, the model information management unit 118 installs the basic model type information 120 as the basic model type information 120a from the FD to the HDD-in-SVP 111 while keeping it in the encrypted state (step S803 in FIG. 8).

Next, the model information management unit 118 checks whether or not the model type list information 121 is stored in the FD (step S804 in FIG. 8).

If it is confirmed that the model type list information 121 is stored in the FD, the model information management unit 118 installs the model type list information 121 as the model type list information 121a from the FD to the HDD-in-SVP 111 while keeping it in the encrypted state (step S805 in FIG. 8).

Finally, the model information management unit 118 stores, among the entry numbers (see FIG. 5) in the model type list information 121a installed in the HDD-in-SVP 111, the entry number corresponding to the performance value of the basic model type information 120a installed also in the in the HDD-in-SVP 111, as a model type to be selected 122a in the HDD-in-SVP 111, and completes the stop-install process in the normal way (step S806 in FIG. 8). In this case, since the model type list information 121 has been provided from the FD, the performance adjustment mechanism becomes valid.

On the other hand, if it is confirmed that the model type list information 121 is not stored in the FD in step S804, the model information management unit 118 further checks whether or not existing model type list information 121a is stored in the HDD-in-SVP 111 (step S807 in FIG. 8).

If it is confirmed that existing model type list information 121a is stored in the HDD-in-SVP 111, the new operation contract provided by the FD becomes a contract in which the model type list information 121 is not provided. Accordingly, the model information management unit 118 deletes the model type list information 121a and the model type to be selected 122a in the HDD-in-SVP 111, and completes the stop-install process in a normal way (step S807->S808 in FIG. 8). In this case, since the model type list information 121 is not provided from the FD, the performance adjustment mechanism becomes invalid.

If it is confirmed that existing model type list information 121a is not stored in the HDD-in-SVP 111, the stop-install process is completed in a normal way directly from step S807 in FIG. 8. In this case also, since the model type list information 121 is not provided from the FD, the performance adjustment mechanism becomes invalid.

When the model information management unit 118 completes the stop-install process in a normal way as described above, upon the normal completion of the process in step S703 in FIG. 7, the install processing unit 115 display a massage of normal completion on the SVP console 124, and terminates the stop-install frame (step S703->S704->S705 in FIG. 7).

Next, an active-install process is explained. This process is executed by the install processing unit 115 in the SVP program execution unit 113 when active upgrade of the product model is performed while keeping the main frame 101 operating.

In this active-install process, the model type list information 121 in the FD set in the FDD 107 is installed as the model type list information 121a in the HDD-in-SVP 111 at the time of active-install (at the time of active-upgrade) of the main frame 101. Next, the model type list information 121a is decoded and loaded in the RAM-in-SVP 112 as the model type list information 121b.

Figure 9:
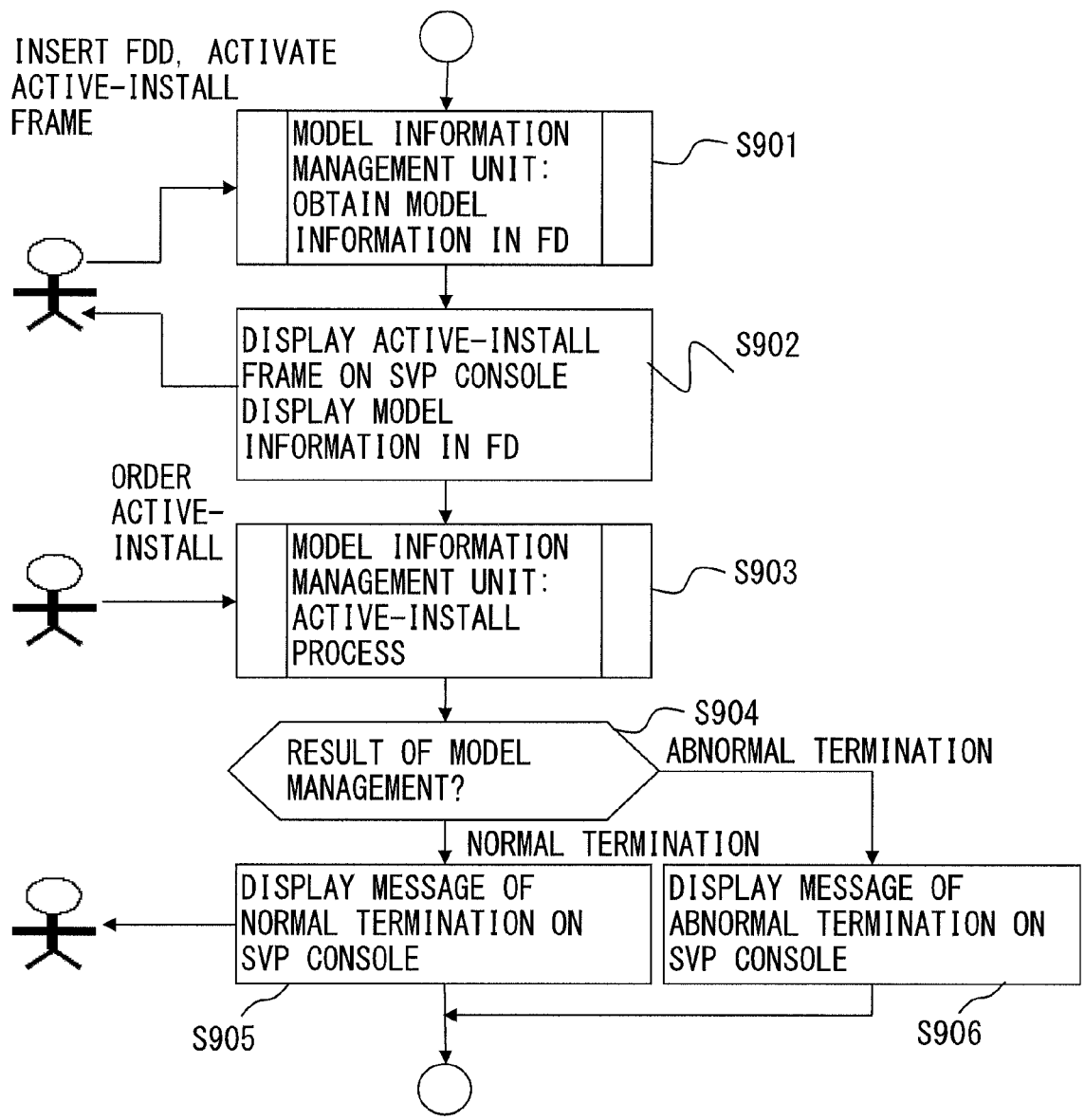
FIG. 9 is an operation flowchart illustrating the operation of an active-install frame executed by the install processing unit.

FIG. 9 is an operation flowchart illustrating the operation of an active-install frame executed by the install processing unit 115. This process is realized by an operation processor provided in the SVP program execution 113 and program software executed by it.

First, when an operation maintenance person (such as a system engineer of the manufacturer offering the main frame 101) inserts a floppy disk (FD) for performance adjustment in the FDD 107 and orders activation of the active-install frame from the SVP console 124, the install processing unit 115 orders the model information management unit 118 to obtain model information in the FD. As a result, the model information management unit 118 obtains, from the basic model type information 120 (see FIG. 4) and the model type list information 121 (see FIG. 5), their model type name and performance value (performance ratio), and notifies the install processing unit 115 of them (step S901 in FIG. 9).

As a result, the install processing unit 115 displays the active-install frame on the SVP console 124, and also displays, for each of the basic model type information 120 and the model type list information 121, their respective model type name and performance value (performance ratio) on the SVP console 124 (step S902 in FIG. 9).

The operation maintenance person orders active-install from the SVP console 124, after checking the display contents. As a result, the install processing unit 115 orders the model information management unit 118 to activate the active-install process (step S903 in FIG. 9).

Figure 10:
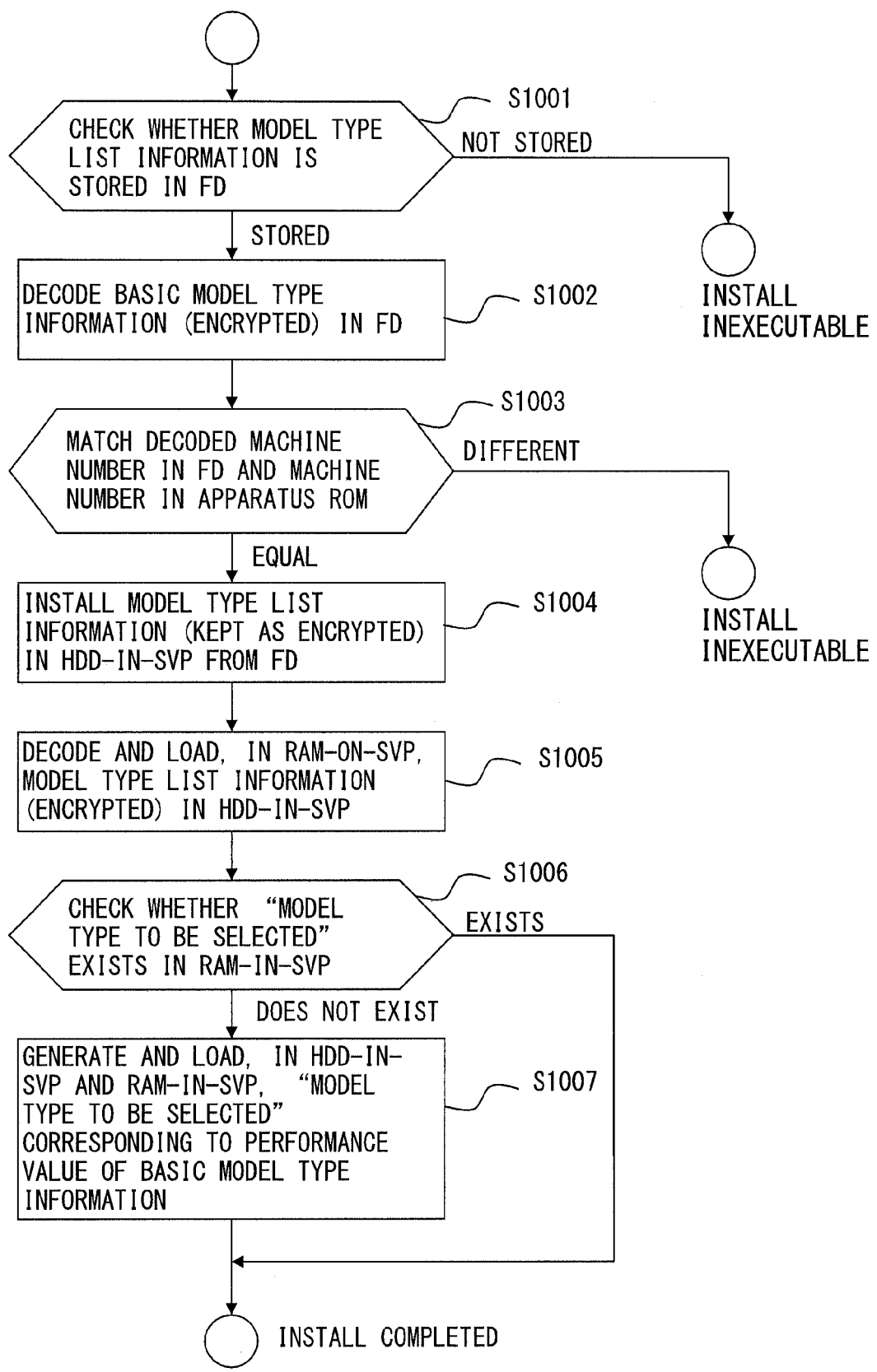
FIG. 10 is an operation flowchart illustrating an active-install process executed by the model information management unit.

FIG. 10 is an operation flowchart illustrating the operation of the active-install process executed by the model information management unit 118. This process is realized by an operation processor provided in the SVP program execution unit 113 and program software executed by it.

First, the model information management unit 118 checks whether or not the model type list information 121 is stored in the FD (step S1001 in FIG. 10).

If it is confirmed that the model type list information 121 is not stored in the FD, the model information management unit 118 performs abnormal terminal of the process as install cannot be executed. In this case, upon the abnormal termination of the process in step S903 in FIG. 9, the install processing unit 115 displays a message of abnormal termination on the SVP console 124, and terminates the active-install frame (step S903->S904->S906 in FIG. 9).

If it is confirmed that the model type list information 121 is stored in the FD in step S1001 in FIG. 10, the model information management unit 118 decodes encrypted basic model type information 120 stored in the FD (step S1002 in FIG. 10).

Next, the model information management unit 118 checks whether or not the machine number decoded from the FD matches with the machine number stored in an apparatus ROM at the main frame 101 side that is not particularly illustrated in the drawing (step S1003 in FIG. 10).

If the two machine numbers do not match with each other, the model information management unit 118 performs abnormal termination of the process as install cannot be executed. In this case, upon the abnormal termination of the process in step S903 in FIG. 9, the install processing unit 115 displays a message of abnormal termination on the SVP console 124, and terminates the stop-install frame (step S903->S904->S906 in FIG. 9).

If the two machine numbers matches each other in step S1003 in FIG. 10, the model information management unit 118 installs the model type list information 121 in the HDD-in-SVP 111 as the model type list information 121*a* while keeping it in the encrypted state from the FD (step S1004 in FIG. 10).

Next, the model information management unit 118 decodes the model type list information 121*a* installed in the HDD-in-SVP 111, and loads the decoding result in the RAM-in-SVP 112 as the model type list information 121*b* (step S1005 in FIG. 10).

Next, the model information management unit 118 checks whether or not the model type to be selected 122*b* already exists in the RAM-in-SVP 112 (step S1006 in FIG. 10).

If the model type to be selected 122*b* does not exist in the RAM-in-SVP 112 yet, the model information management unit 118 stores, among the entry numbers (see FIG. 5) in the model type list information 121*a* installed in the HDD-in-SVP 111, the entry number corresponding to the performance value of the basic model type information 120*a* also installed in the HDD-in-SVP 111 as the model type to be selected 122*a* and 122*b* (the same value) in the HDD-in-SVP 111 and the RAM-in-SVP 112, respectively, and completes the active-install process in a normal way (step S1007 in FIG. 10).

If the model type to be selected 122*b* already exists in the RAM-in-SVP 112, since there is no need to change that model type to be selected 122*b* and the model type to be selected 122*a* (the same value) in the HDD-in-SVP 111, the model information management unit 118 completes the active-install process directly from step S1006 in FIG. 10 in a normal way.

When the model information management unit 118 completes the active-install process in a normal way, upon the normal termination of the process in step S903 in FIG. 9, the install processing unit 115 displays a message of normal termination on the SVP console 124, and terminates the active-install frame (step S903->S904->S905 in FIG. 9).

Next, the initialization process is explained. This process is executed by the initialization processing unit 116 in the SVP program execution unit 113 at the time of initialization (at the time of booting) of the main frame 101.

With this initialization process, at the time of power-on of the main frame 101, a process is executed in which the SVP 102 decodes the basic model type information 120*a*, the model type list information 121*a* and the model type to be selected 122*a* respectively, and loads the respective decoding results as the basic model type information 120*b*, the model type list information 121*b* and the model type to be selected 122*b* in the RAM-in-SVP 112, and sets the performance of the CPU 104 by extracting, from the model type list information 121*b*, and setting up, in the degrade counter 106, the degrade counter value corresponding to the model type indicated by the model type to be selected 122*b*.

Figure 11:
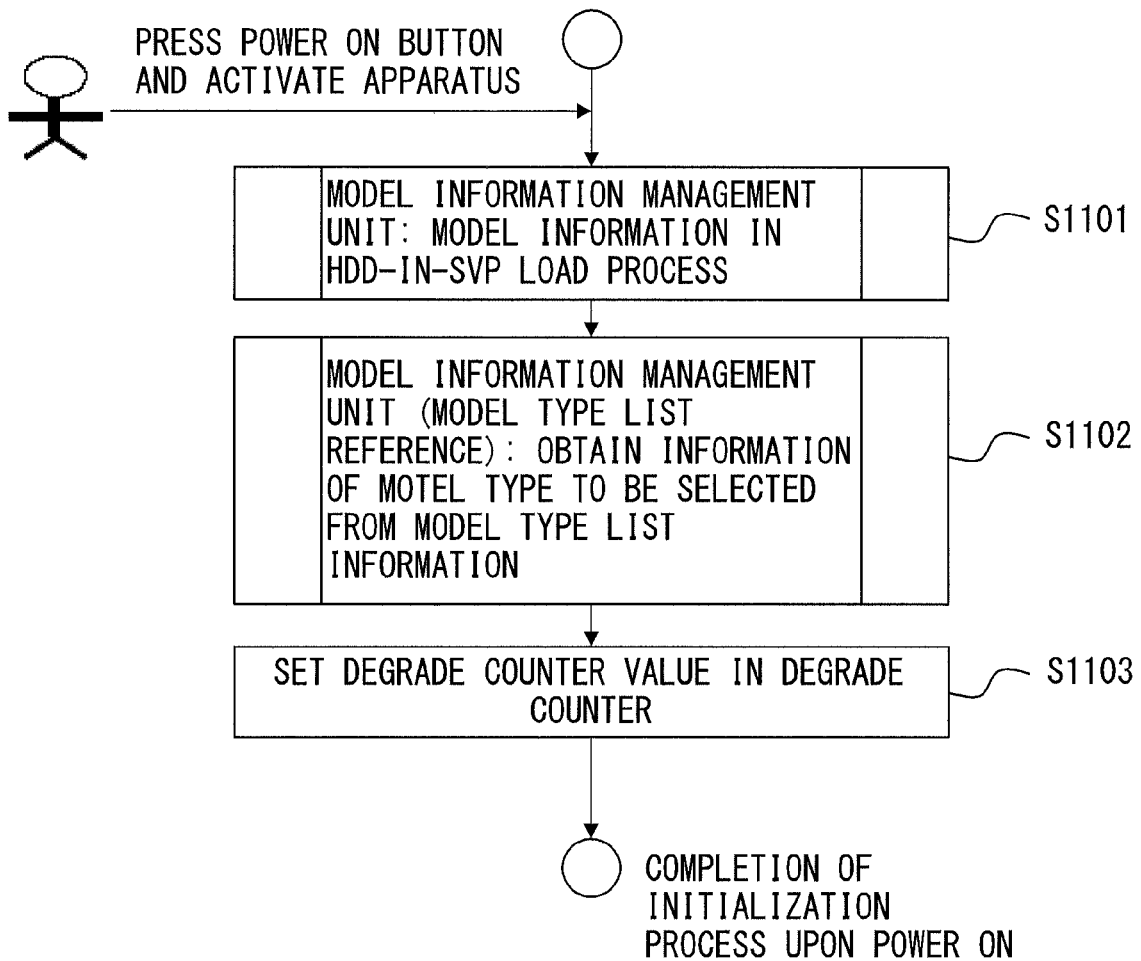
FIG. 11 is an operation flowchart illustrating the operation of an initialization process executed by an initialization processing unit.

FIG. 11 is an operation flowchart illustrating the operation of the initialization process executed by the initialization processing unit 116. This process is realized by an operation processor provided in the SVP program execution unit 113 and program software executed by it.

First, an operation maintenance person (such as a system administrator of the organization using the main frame 101) pushes a power-on button on a power panel 108 (in FIG. 1, the "ON" button on the power panel 108), to activate the apparatus of the main frame 101. According to this, the initialization unit 116 orders the model information management unit 118 to activate an HDD-in-SVP model information load process (S1101 in FIG. 11).

Figure 12:
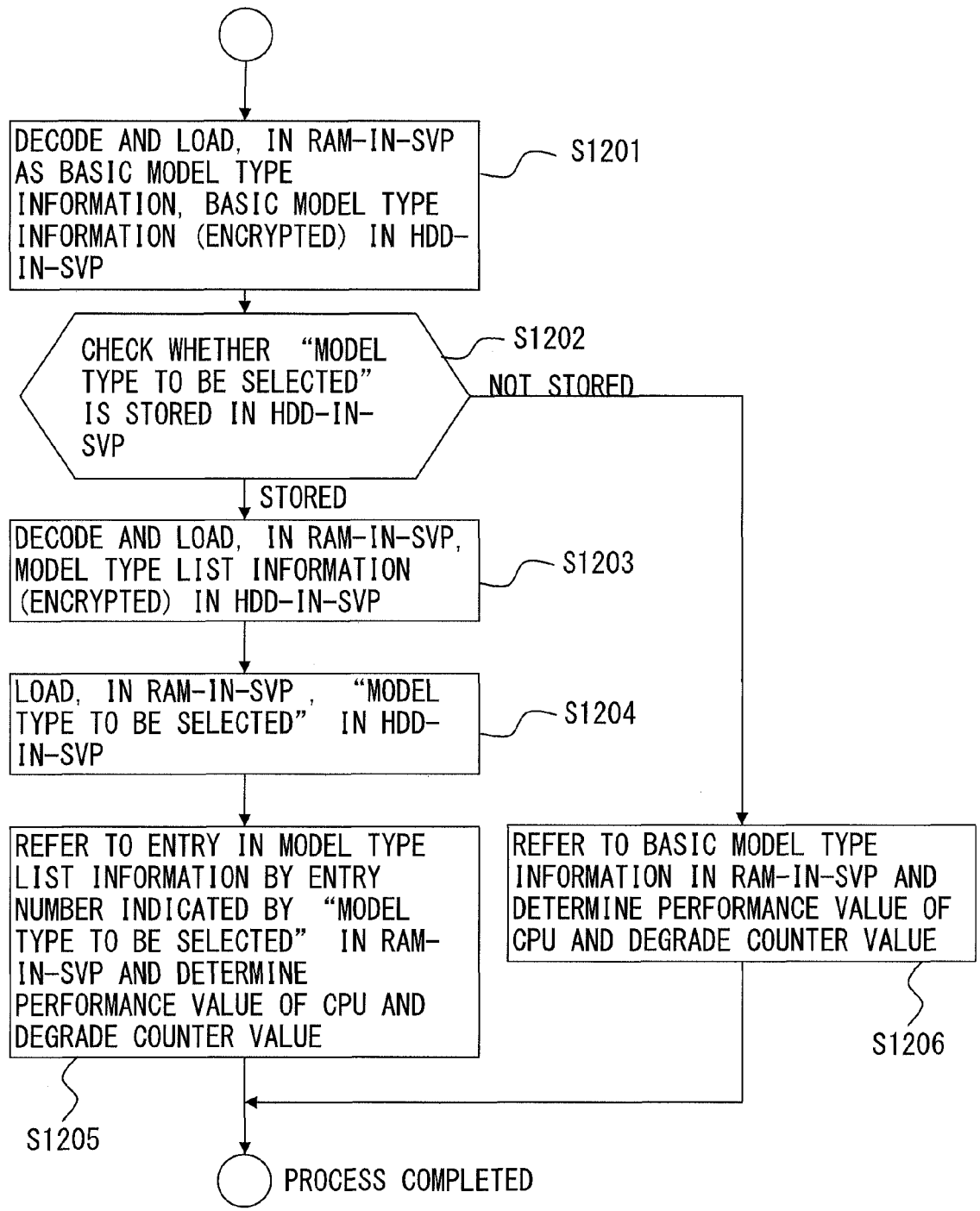
FIG. 12 is an operation flowchart illustrating the operation of an HDD-in-SVP model information load process executed by the model information management unit.

FIG. 12 is an operation flowchart illustrating the operation of the HDD-in-SVP model information load process executed by the model information management unit 118.

First, the model information management unit 118 decodes encrypted basic model type information 120*a* stored in the HDD-in-SVP 111, and loads the decoding result as the basic model type information 120*b* in the RAM-in-SVP 112 (S1201 in FIG. 12).

Next, the model information management unit 118 checks whether or not the model type to be selected 122*a* is stored in the HDD-in-SVP 111 (S1202 in FIG. 12).

If it is confirmed that the model type to be selected 122*a* is stored in the HDD-in-SVP 111, the model information unit 118 decodes the encrypted model type list information 121*a* stored in the HDD-in-SVP 111, and loads the decoding result as the model type list information 121*b* in the RAM-in-SVP 112 (S1203 in FIG. 12).

Next, the model information management unit 118 loads the model type to be selected 122*a* stored in the HDD-in-SVP 111 as the model type to be selected 122*b* in the RAM-in-SVP 112 (S1204 in FIG. 12).

Finally, the model information management unit 118 refers to the entry in the model type list information 121*b* loaded in the RAM-in-SVP 112 from the entry number indicated by the model type to be selected 122*b* loaded in the RAM-in-SVP 112 (see FIG. 5), determines the performance value of the CPU 104 and the degrade counter value to be set, and completes the HDD-in-SVP model information load process (S1205 in FIG. 12).

If it is confirmed that the model type to be selected 122a is not stored in the HDD-in-SVP 111, the model information management unit 118 refers to the basic model type information 120a stored in the RAM-in-SVP 112 (see FIG. 4), determines the performance of the CPU 104 and the degrade counter value to be set, and completes the HDD-in-SVP model information load process (S1202->S1206 in FIG. 12).

When the HDD-in-SVP model information load process by the model information management unit 118 described above is completed, the initialization processing unit 116 further orders the model information management unit 118 a model type list referral process. According to this, the model information management unit 118 notifies the initialization processing unit 116 of the degrade counter value determined previously in S1202 or S1206, from the model type list information 121b in the RAM-in-SVP 112 (FIG. 5) (S1101->S1102 in FIG. 11).

The initialization processing unit 116 sets up the degrade counter value notified from the model information management unit 118 in the degrade counter 106 in the performance control pulse generation unit 103 in FIG. 1, and completes the initialization process at the time of power-on. (S1103 in FIG. 11).

Next, a model type list display process is explained.

Once the model type list information 121 is introduced in the main frame 101 by the stop-install frame, the active-install frame described above, the operation maintenance person (such as a system administrator of the organization using the main frame 101) is able to make the model type list information 121 displayed on the console to check the range with which adjustment of the performance can be performed, from the main body OS console 109.

Figure 13:
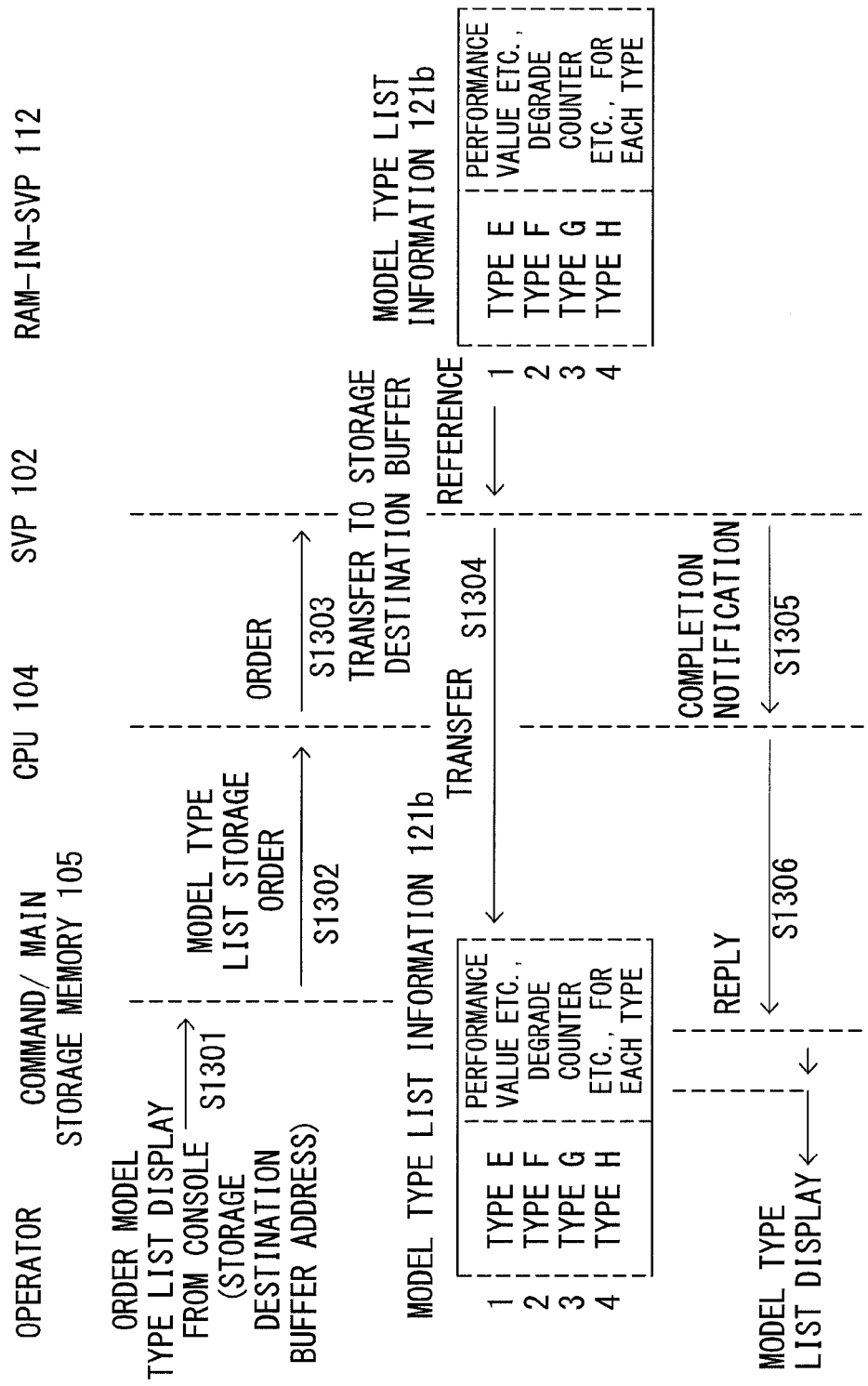
FIG. 13 is an operation sequence diagram illustrating the operation of a model type list display process.

FIG. 13 is an operation sequence diagram illustrating the operation of the model type list display process.

First, the operator (such as the operation maintenance person) issues a display order command for the model type list, from the main body OS console 109. At this time, the operator also specifies the storage-destination address of the model type list information 121b on the main storage memory 105 (S1301 in FIG. 13).

This command is issued as a model type list storage order to the CPU 104 (S1302 in FIG. 13).

The CPU 104 issues an order corresponding to the command to the SVP 102. As a result, the performance adjustment processing unit 117 in the SVP program execution unit 113 actives a model type list information storage process (S1303 in FIG. 13). With this process, a process is executed in which the performance adjustment processing unit 117 transfers the model type list information 121b stored in the RAM-in-SVP 112 to the storage-destination address on the main storage memory 105 specified by the model type list display command (S1304 in FIG. 13).

FIG. 14 is an operation flowchart illustrating the operation of the model type list information storage process executed by the performance adjustment processing unit 117. This process is realized by an operation processor provided in the SVP program execution unit 113 and program software executed by it.

First, the performance adjustment processing unit 117 checks with the model information processing unit 118 whether or not the performance adjustment mechanism is valid. The model information management unit 118 determines the validity of the performance adjustment mechanism by checking whether or not the model type list information 121b is stored in the RAM-in-SVP 112, and returns the result to the performance adjustment processing unit 117 (S1401 in FIG. 14).

If the mode information management unit 118 replies with the invalidity of the performance adjustment mechanism, the performance adjustment processing unit 117 notifies the CPU 104 of order termination indicating the that execution cannot be performed, and completes the model type list information storage process (S1402->S1406 in FIG. 14).

On the other hand, if the model information management unit 118 replies with the validity of the performance adjustment mechanism, a further order to the model information management unit 118 to refer to the model type list information 121b stored in the RAM-in-SVP 112 is performed by the performance adjustment processing unit 117. The model information management unit 118 reads out the model type list information 121b from the RAM-in-SVP 112, and notifies the performance adjustment processing unit 117 of it (S1402->S1403 in FIG. 14).

The performance adjustment processing unit 117 transfers the model type list information 121b notified from the model information management unit 118 to the storage-destination address on the main storage memory 105 specified by the order from the CPU 104 (S1404 in FIG. 14).

Finally, the performance adjustment processing unit 117 notifies the CPU 104 of order termination indicating normality, and completes the model type list information storage process (S1405 in FIG. 14).

Upon receiving a completion notification indicating order termination from the performance adjustment processing unit 117 as described above (S1305 in FIG. 13), the CPU 104 accesses the storage-destination address on the main storage memory 105 mentioned above, and displays the model type name, the performance value (performance ratio) and the like in the model type list information 121b on the main body OS console 109 (S1306 in FIG. 13). In the case of termination indicating that execution cannot be performed, the CPU 104 performs error display on the main body OS console 109.

Next, a model type change process is explained.

Once the model type list information 121 is introduced in the main frame 101 by the stop-install frame, the active-install frame described above, the operation maintenance person (such as a system administrator of the organization using the main frame 101) is able to order change of the model type without stopping the operation of the main frame 101.

Figure 15:
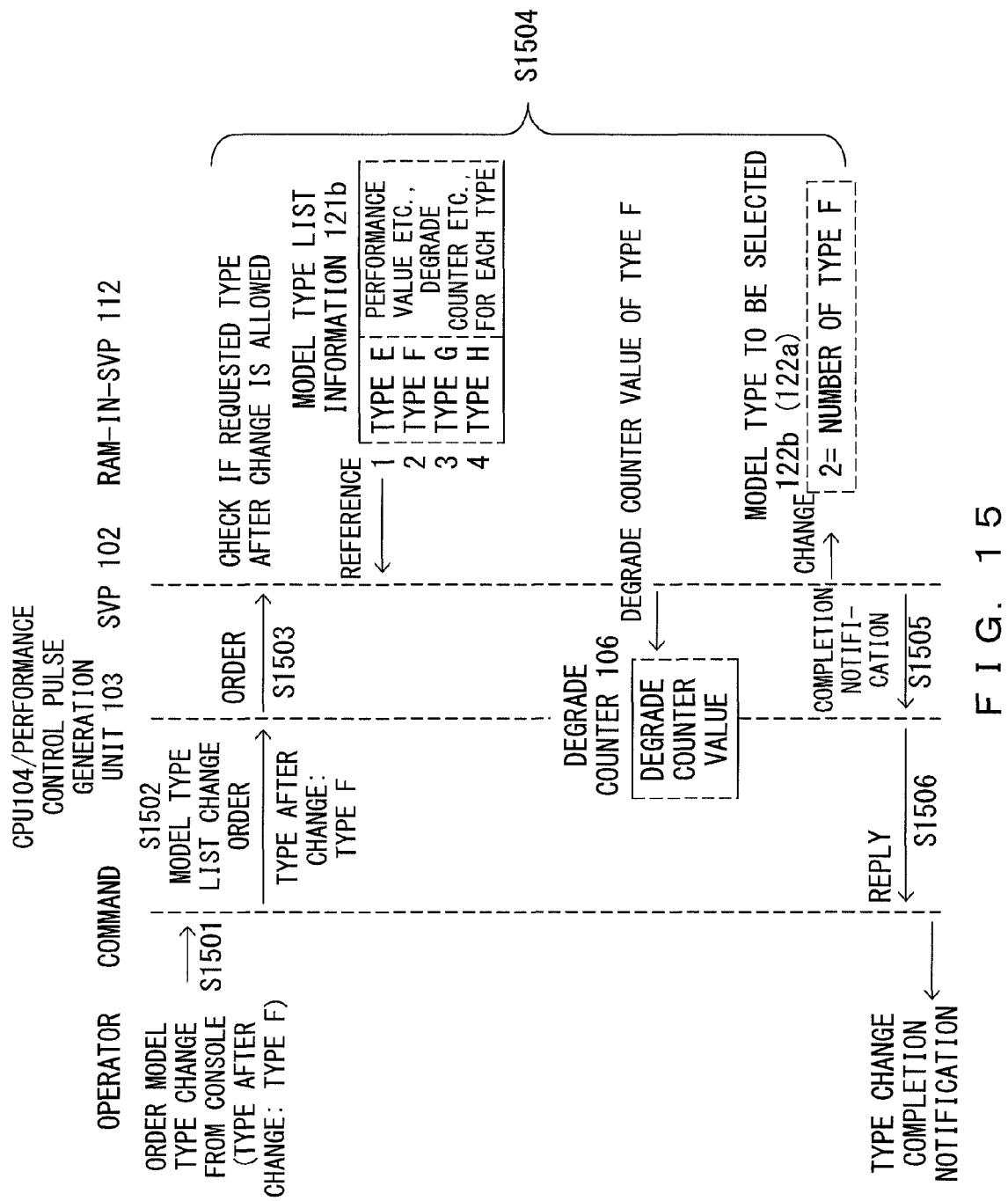
FIG. 15 is an operation sequence diagram illustrating the operation of a model type change process.

FIG. 15 is an operation sequence diagram illustrating the operation of the model type change process.

First, the operator (such as the operation maintenance person) issues a change order command for the model type from the main body OS console 109. Here, it is assumed that change to type F is ordered (S1501 in FIG. 15).

This command is issued as a model type list change order to the CPU 104 (S1502 in FIG. 15).

The CPU 104 issues an order corresponding to the command to the SVP 102. As a result, the performance adjustment processing unit 117 in the SVP program execution unit 113 activates the model type change process (S1503 in FIG. 15). With this process, a process is executed in which the performance adjustment processing unit 117 performs assessment of validity of change to the model type after change, set up of the degrade counter value of the model type after change in the degrade counter 106, change of the model type to be selected 122b in the RAM-in-SVP 112, change of the model type to be selected 122a in the HDD-in-SVP 111, generation of the model type change log 123 and notification to the maintenance center 110 (S1504 in FIG. 15).

Figure 16:
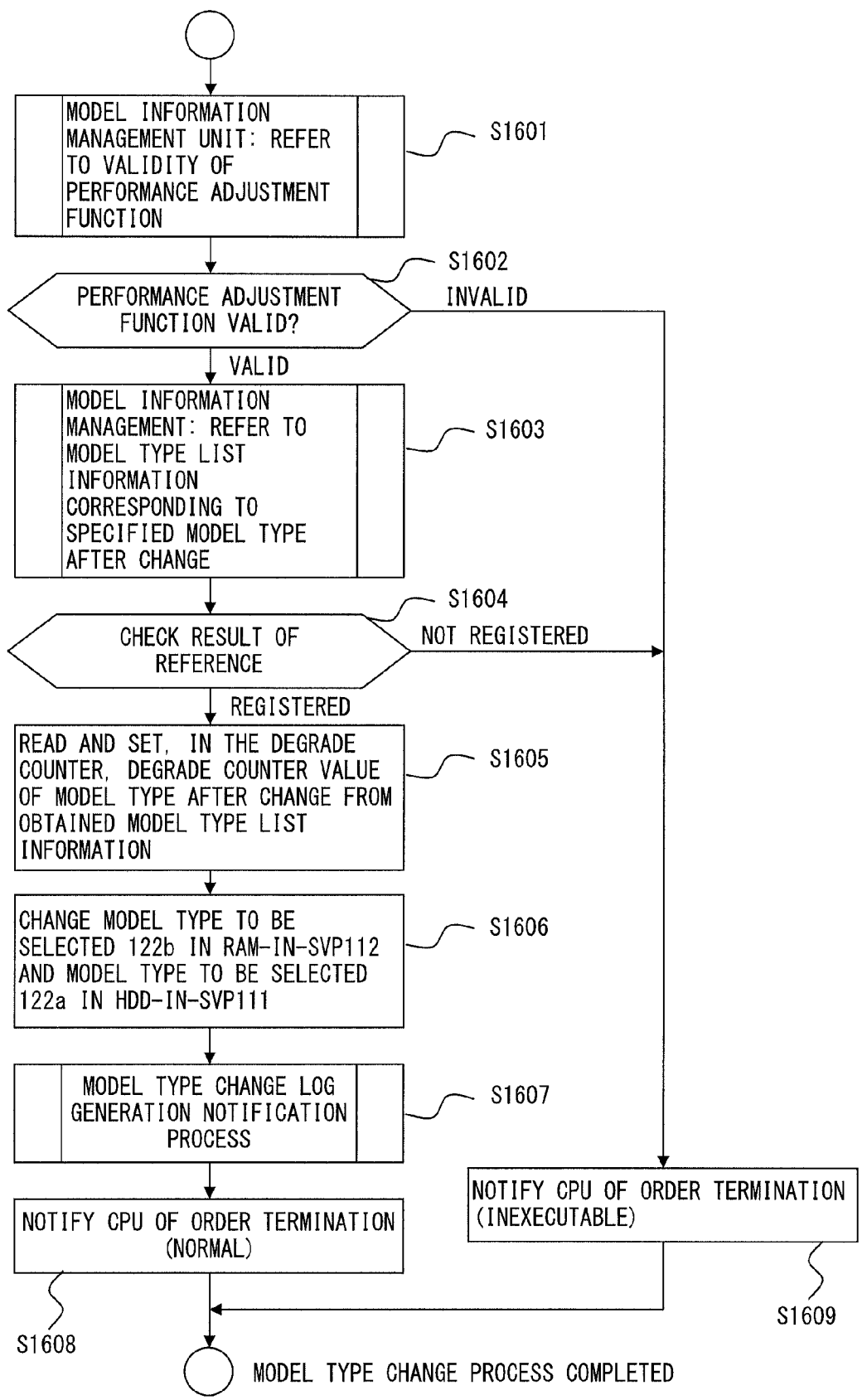
FIG. 16 is an operation flowchart illustrating the operation of a model type change process executed by the performance adjustment processing unit.

FIG. 16 is an operation flowchart illustrating the operation of the model type change process executed by the performance adjustment processing unit 117. This process is realized by an operation processor provided in the SVP program execution unit 113 and program software executed by it.

First, the performance adjustment processing unit 117 checks whether or not the performance adjustment mechanism is valid. The model information management unit 118 determines the validity of the performance adjustment mechanism by checking whether or not the model type list information 121b is stored in the RAM-in-SVP 112, and returns the result to the performance adjustment processing unit 117 (S1601 in FIG. 16).

If the mode information management unit 118 replies with the invalidity of the performance adjustment mechanism, the performance adjustment processing unit 117 notifies the CPU 104 of order termination indicating that execution cannot be performed, and completes the model type change process (S1602->S1609 in FIG. 16).

On the other hand, if the model information management unit 118 replies with the validity of the performance adjustment mechanism, the performance adjustment processing unit 117 further orders the model information management unit 118 to refer to the model type list information 121b corresponding to the model type after change. As a result, the model information management unit 118 refers to the model type list information 121b (see FIG. 5) in the RAM-in-SVP 112, obtains the degrade counter value and the entry number corresponding to the model type after change, and notifies the performance adjustment processing unit 117 of them.

The performance adjustment processing unit 117 performs judgment of the result of the reference by the model information management unit 118 described above, and if the model type list information 121b corresponding to the model type after change is not registered in the RAM-in-SVP 112, notifies the CPU 104 of order termination indicating that execution cannot be performed, and completes the model type change process (S1604->S1609 in FIG. 16).

If the model type list information 121b corresponding to the model type after change is registered in the RAM-in-SVP 112, the performance adjustment processing unit 117 reads the degrade counter value corresponding to the model type after change notified from the model information management unit 118 and sets it in the degrade counter 106 (see FIG. 1) in the performance control pulse generation unit 103 (S1605 in FIG. 16).

Further, the performance adjustment processing unit 117 changes the storage content of the model type to be selected 122b in the RAM-in-SVP 112 and the model type to be selected 122a in the HDD-in-SVP 111 to the entry number corresponding to the model type after change notified from the model information management unit 118 (S1606 in FIG. 16).

After that, after execution of a model type change log generation notification process described later is executed (S1607 in FIG. 16), notification to the CPU 104 of order termination indicating normality is performed, and the model type change process is completed (S1608 in FIG. 16).

Upon receiving a completion notification indicating order termination from the performance adjustment processing unit 117 as described above (S1505 in FIG. 15), the CPU 104 performs display for notification of completion of type change on the main body OS console 109 (S1506 in FIG. 15). In the case of termination indicating that execution cannot be performed, error display is performed on the main body OS console 109.

Figure 17:
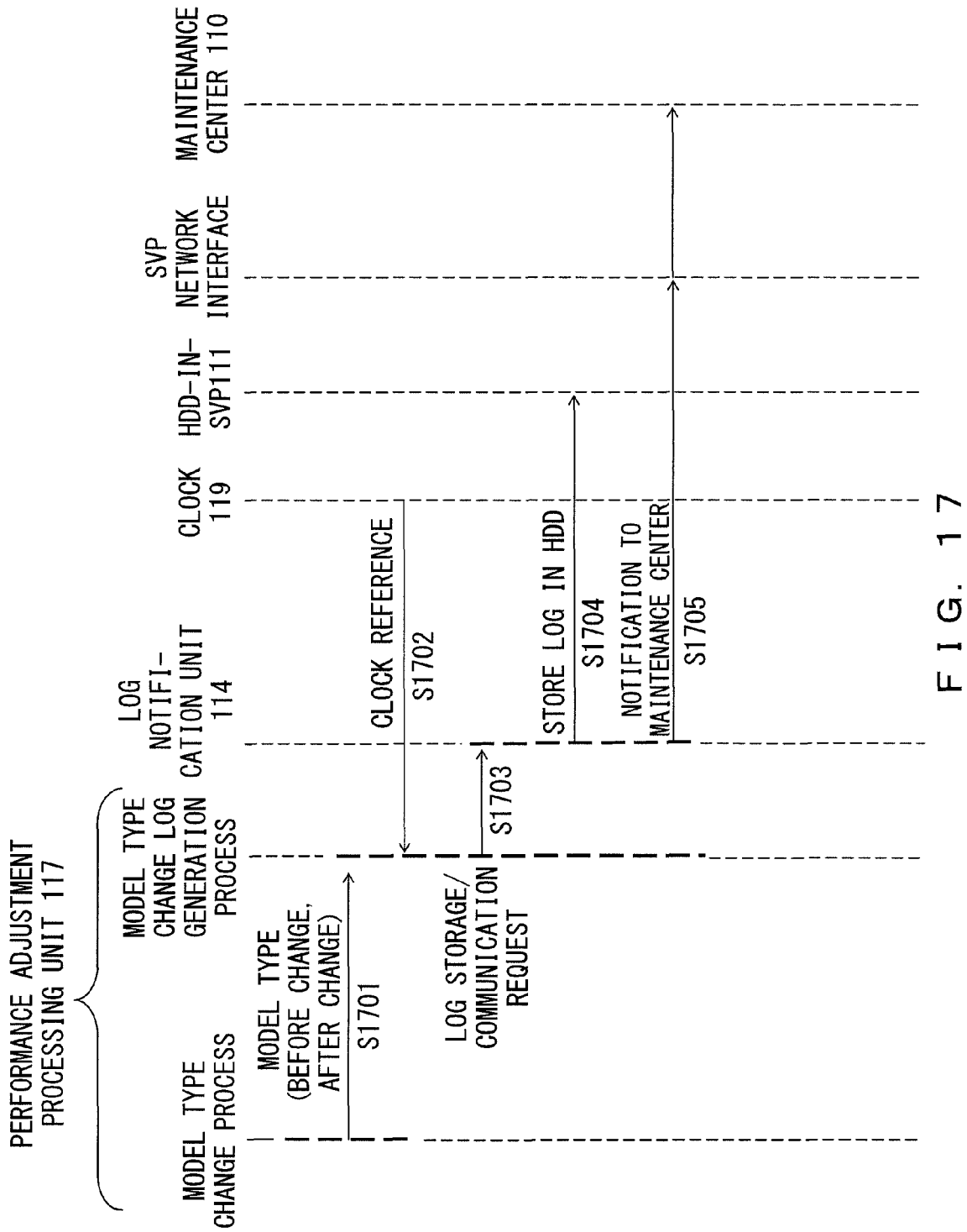
FIG. 17 is an operation sequence diagram illustrating the operation of a model type change log generation notification process.

FIG. 17 is an operation sequence diagram illustrating the operation of a model type change log generation notification process executed in S1607 in FIG. 16.

First, the performance adjustment processing unit 117 performs notification of the model type name before change and the model type name after the change and activates the model type change log generation notification process as the process in S1607 in FIG. 16 (S1701 in FIG. 17).

Figure 18:
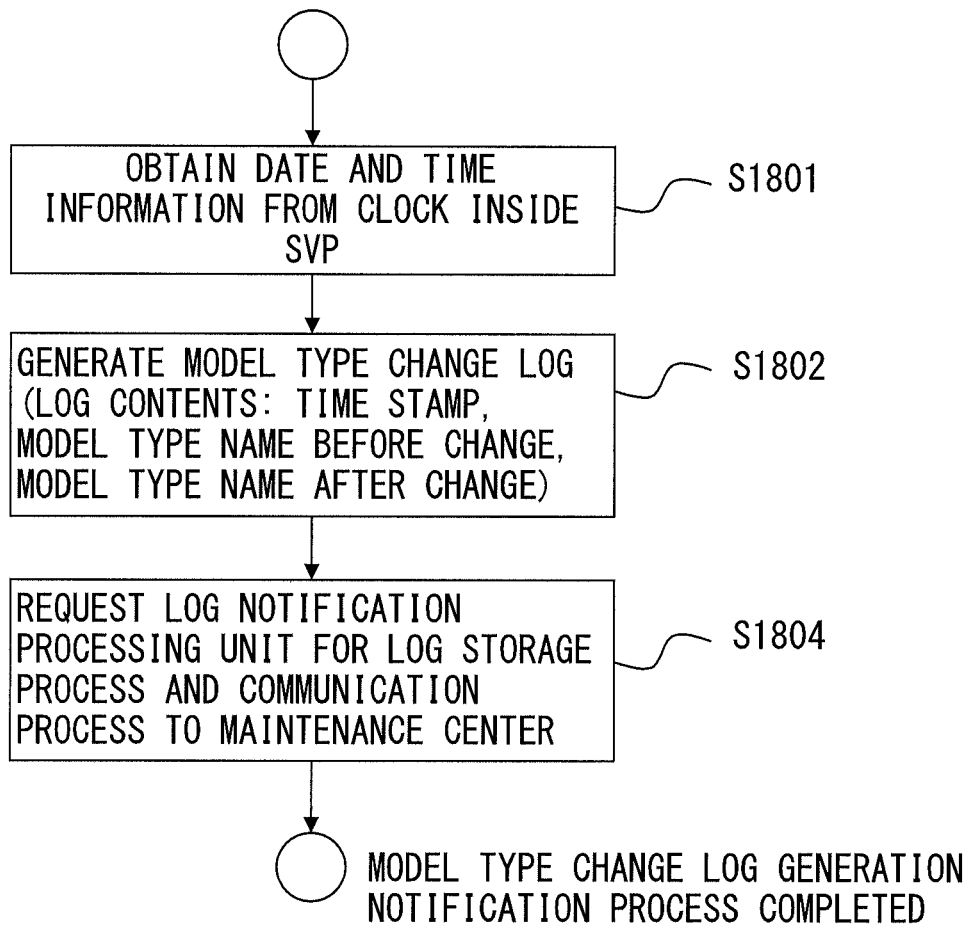
FIG. 18 is an operation flowchart illustrating the operation of a model type change log generation notification process executed by the performance adjustment processing unit.

FIG. 18 is an operation flowchart illustrating the operation of the model type change log generation notification process executed by the performance adjustment processing unit 117. This process is realized by an operation process provided in the SVP program execution unit 113 and program software executed by it.

First, the performance adjustment processing unit 117 obtains date and time information from a clock 119 in the SVP 102 (S1801 in FIG. 18, S1702 in FIG. 17).

Next, the performance adjustment processing unit 117 generates a model type change log. Log contents are the model type change date and time (time stamp), the model type name before change, the model type name after change (S1802 in FIG. 18).

After that, the performance adjustment processing unit 117 requests the log notification processing unit 114 for a log storage process and a communication process with the maintenance center 110 (see FIG. 1) (S1804 in FIG. 18, S1703 in FIG. 17).

As a result, the log notification processing unit 114 activates a log storage/communication process.

FIG. 19 is an operation flowchart illustrating the operation of the log storage/communication process executed by the log notification processing unit 114. This process is realized by an operation processor provided in the SVP program execution unit 113 and program software executed by it.

First, the log notification processing unit 114 stores the model type change log 123 (see FIG. 1) in the HDD-in-SVP 111 (S1901 in FIG. 19, S1704 in FIG. 17).

Then, the log notification processing unit 114 transmits the model type change log to the remote maintenance center 110 through an SVP network interface that is not particularly illustrated in FIG. 1 (S1902 in FIG. 19, S1705 in FIG. 17).

When the process in the log notification processing unit 114 is terminated by the operation described above, the performance adjustment processing unit 117 confirms the termination of S1804 in FIG. 18 and completes the model type change log generation notification process in S1607 in FIG. 16.

According the functions provided by the embodiments explained above, it becomes possible for the user of the main frame 101 to upgrade the performance of the apparatus by changing the model type without stopping the main frame when work becomes temporarily busy.

Since change of the model type by the user can be managed as a model type change log in the maintenance center 110 at the manufacturer, the manufacturer can manage the usage fee based on the log, and the user can adjust the cost consciously according to planned increases and degreases in the processing amount.

Also in the main frame 101 of a user who has not adopted the adjustment function of the apparatus performance by the user, it becomes possible to install the adjustment function of the unit performance by the user without changing the CPU configuration and without stopping the operation by the user according to the active-install function.

Embodiments according to the present invention are not limited to the performance adjustment method of a CPU using a degrade counter, and can be applied to various methods with which the performance of a CPU can be adjusted by providing a certain performance adjustment control value.

Embodiments according to the present invention are not limited to the performance adjustment method of a main frame using a service processor, and can be applied to any computer system as long as the system can realize each functions disclosed in the embodiments described above.

In addition, active-install of the model type list information and the like in the system is not limited to the method via floppy disk, and may be performed via various external storage media or a network such as the Internet.

Alternatively, a configuration may be adopted in which the model type list information is held not in a hard disk of the main frame but in a remote maintenance center, and is obtained from the maintenance center and loaded on the memory at the time of the initialization process of the main frame.

Furthermore, a configuration may be adopted in which the model type list information is not held at all at the main frame side, and an enquiry is performed with a remote maintenance center each time a model type display/change command is issued to obtain model type list information that is changeable, and to perform a change process of the model type and the like is performed.

According to the functions provided by the embodiments described above, it becomes possible for the user of an information processing apparatus such as a main frame to upgrade the performance of the apparatus by ordering change of the performance type based on the performance type list information without stopping the information processing apparatus, when work becomes temporarily busy.

Since change of the performance type by the user can be managed as a performance type specification history information in the maintenance center at the manufacturer, the manufacturer can manage the usage fee based on the history information, and the user can adjust the cost consciously according to planned increases and degreases in the processing amount.

Also in an information processing apparatus of a user who has not adopted the adjustment function of the apparatus performance by the user, it becomes possible to install the adjustment function of the unit performance by the user without changing the CPU configuration and without stopping the operation by the user according to the function of a performance type list information input unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A performance adjustment apparatus connected to an information processing apparatus, the performance adjustment apparatus comprising:
    a performance adjustment unit that controls operation processing performance of an operation processing apparatus of the information processing apparatus based on a specified performance adjustment value;
    a performance type list information management unit that manages and stores, in a performance type list information storage unit included therein, performance type list information comprising a plurality of pairs of a performance type and a performance adjustment value;
    a performance type specification unit that specifies a performance type in the performance type list information managed by the performance type list information management unit and changes the performance type;
    a performance adjustment value setting unit that obtains a performance adjustment value corresponding to the performance type specified by the performance type specification unit from the performance type list information management unit, and sets the obtained performance adjustment value in the performance adjustment unit; and
    a performance type specification history management unit that manages specification history information of the performance type in the performance type specification unit with time information of the specification and notifies the specification history information of the performance type to a maintenance center apparatus capable of communicating with the information processing apparatus.

2. The performance adjustment apparatus according to claim 1, wherein the performance type list information management unit further comprises a performance type list information input unit that inputs the performance type list information to the performance type list information storage unit from outside the information processing apparatus.

3. The performance adjustment apparatus according to claim 1, wherein the performance type list information input unit inputs the performance type list information to the performance type list information storage unit from a portable recording medium set in a portable recording medium driving apparatus connected to the information processing apparatus.

4. The performance adjustment apparatus according to claim 1, wherein the performance type list information input unit inputs the performance type list information to the performance type list information storage unit from a maintenance center apparatus capable of communicating with the information processing apparatus.

5. The performance adjustment apparatus according to claim 1, wherein the performance type list information input unit inputs the performance type list information to the performance type list information storage unit from a terminal apparatus connected to the information processing apparatus.

6. The performance adjustment apparatus according to claim 1, wherein the performance type list management unit obtains the performance type list information from a maintenance center apparatus capable of communicating with the information processing apparatus according to an operation to the performance type specification unit.

7. The performance adjustment apparatus according to claim 1, wherein the performance type specification history management unit makes a hard disk drive connected to the information processing apparatus store the specification history information of the performance type.

8. The performance adjustment apparatus according to claim 1, wherein the performance type list information management unit encrypts the performance type list information, and manages the encrypted performance type list information, and notifies a decrypted performance adjustment value corresponding to a performance type of the encrypted performance type list information specified by the performance type specification unit to the performance adjustment value setting unit.

9. A performance adjustment method for controlling a processing performance of an information processing apparatus based on a specified performance adjustment value, comprising:

specifying a performance type in performance type list information comprising a plurality of pairs of a performance type and a performance adjustment value;
   changing the performance type based on the specified performance type;
   obtaining a performance adjustment value corresponding to the specified performance type;
   setting the obtained performance adjustment;
   storing specification history information indicating history of specifying the performance type information in a hard disk drive of the information processing apparatus;
   managing the specification history information with information indicating date and time that the performance type information is specified; and
   notifying the specification history information of the performance type to a maintenance apparatus capable of communicating with the information processing apparatus.

10. The performance adjustment method according to claim 9, wherein the performance type list information is managed by encrypting the performance type list information, and
   wherein the method further comprises:
      decrypting the encrypted performance adjustment value corresponding to the specified performance type; and
   notifying the decrypted performance adjustment value.

* * * * *